Jan. 6, 1942. M. B. THOMAS Re. 21,998

GAS LIFT VALVE

Original Filed Feb. 18, 1938 3 Sheets-Sheet 1

Maurice B. Thomas INVENTOR.

BY

P. L. Young ATTORNEY.

Jan. 6, 1942. M. B. THOMAS Re. 21,998

GAS LIFT VALVE

Original Filed Feb. 18, 1938 3 Sheets-Sheet 2

Maurice B. Thomas INVENTOR.

BY

P. L. Young ATTORNEY.

Jan. 6, 1942. M. B. THOMAS Re. 21,998

GAS LIFT VALVE

Original Filed Feb. 18, 1938 3 Sheets-Sheet 3

Maurice B. Thomas INVENTOR.

BY

P. L. Young ATTORNEY.

Reissued Jan. 6, 1942

Re. 21,998

UNITED STATES PATENT OFFICE 21,998

GAS LIFT VALVE

Maurice B. Thomas, Houston, Tex.

Original No. 2,216,967, dated October 8, 1940, Serial No. 191,200, February 18, 1938. Application for reissue October 6, 1941, Serial No. 413,832

15 Claims. (Cl. 103—232)

The present invention is directed to gas lift valves for use in the propulsion of liquid from a low level to a higher level. Primarily, it is concerned with gas-lift valves to be used in oil wells.

As is known, a deposit of petroleum oil is usually accompanied by a gas deposit which presses down on the upper surface of the oil and assists in forcing it to the surface. Inevitably, the oil produced contains more or les dissolved or suspended gas whereby in flowing through tubing from the deposit to the surface its specific gravity as a liquid is less than the actual specific gravity of the gas free oil.

It has been the practice to rely on a decrease of density of oil due to aeration or gasification to increase the flow of oil in wells in which the formation pressure has become too low for normal flow. The aeration has been accomplished by providing valves along the tubing and forcing gas, by one means or another, through these valves into the oil in the tubing thereby imparting a decrease in specific gravity and a lifting action to the column of fluid.

Hitherto, these valves have operated either on the pressure differential principle, according to which the head of oil in the tubing is directly opposed to a gas pressure outside the tubing, or vice versa, or the velocity principle, according to which the valve will open when the velocity of the oil drops below a certain predetermined minimum. Both types have the disadvantage that should the oil in the tubing or casing, as the case may be, drop below the level of any of the valves, these valves will open thereby leading to a waste of gas and an actual repression of oil flow. In addition, when a string of such valves is employed, as is usually the case, more valves than are actually needed are generally set into operation, thereby causing an expensive waste of gas.

The primary object of the present invention is the provision of a valve of this general type which operates on a principle quite different from those previously relied upon, this principle being that when the flow of oil in a tubing or casing, as the case may be, decreases or stops, the specific gravity of the liquid increases due to the loss or reduction of gas therein. The valve of the present invention depends for operation on this change in specific gravity.

A further object of the present invention is the provision of a valve which so operates that when a string of them is employed no more than are actually required will operate to feed gas into the oil.

An additional object of the present invention is the provision of a valve of the type described which is simple in construction and has a minimum of moving parts, whereby initial cost and maintenance are reduced.

Further objects and advantages of the present invention will appear from the following detailed description of the accompanying drawings, in which—

As previously stated, the valve of the present invention depends for operation upon the increase in specific gravity of the well liquid due to the loss of gas therefrom when the flow of such liquid decreases or stops. Such operation is brought about by the difference in specific gravity of the well liquid and a standard liquid having a selected specific gravity. In order to provide a uniform terminology in this disclosure and to avoid confusion of the various fluids to which reference is made, the word "fluid" as used herein designates the pressure fluid or gas which is utilized to propel the well liquid from a low level to a higher level in the well. The word "liquid" designates the well liquid although it is to be understood that, as is well known, such well liquid frequently comprises a mixture of oil, water and/or gas. The term "standard liquid" is used to designate a quantity of liquid which is provided and which possesses a selected specific gravity so that operation of the valve of the invention is determined by the difference in specific gravity of the liquid and such standard liquid.

Figure 1:
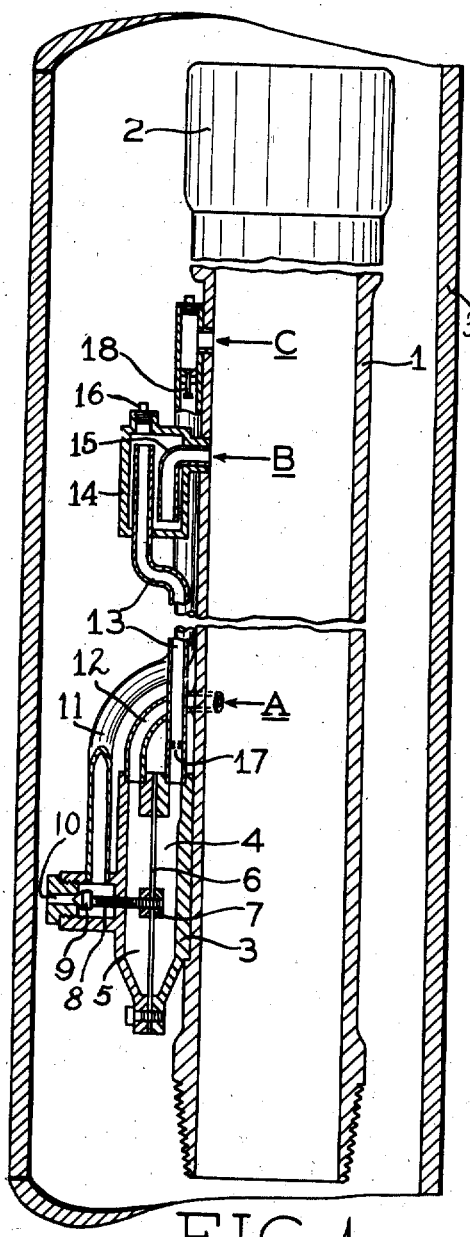
Figure 1 is a side elevation, partly in section, of a valve arrangement according to the present invention.
Figure 2:
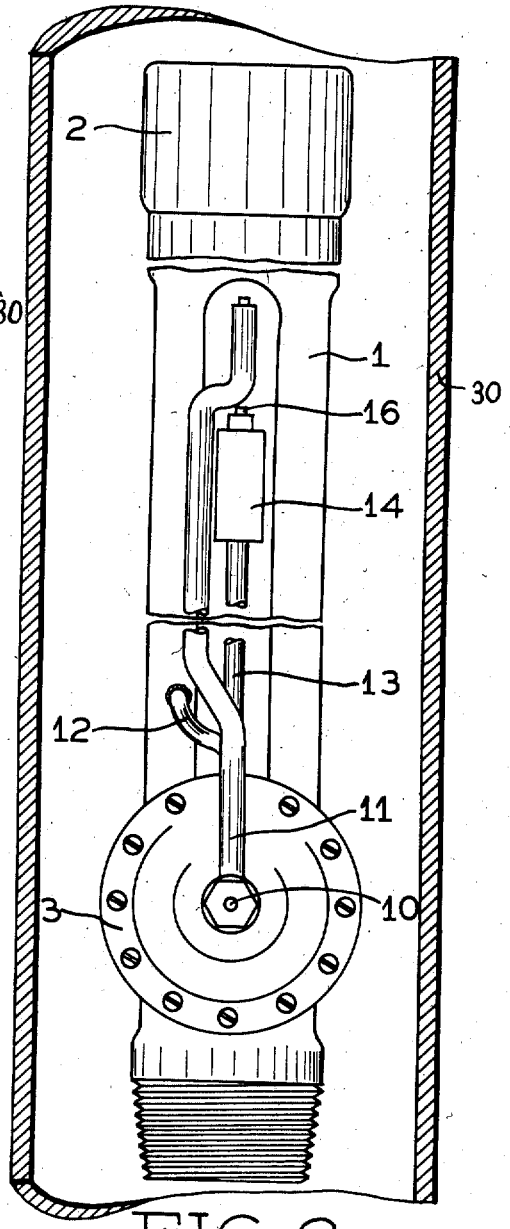
Figure 2 is a front elevation of the arrangement shown in Figure 1.

Referring to Figure 1 in detail, the valve mechanism is assembled on the outside of a tubular member 1 which will correspond in diameter to the tubing used in the well and which is provided with a coupling 2 on one end and has its other end screw threaded for connection in a string of tubing. This tubing is surrounded in a well by a casing 30 which is of larger diameter. Thus the valve mechanism is arranged in the annular space between the tubing and the casing.

A casing 3 is attached, by welding or otherwise, to the wall of the tubing and is provided with two interior chambers 4 and 5 separated by a diaphragm 6 in the center of which is a screw threaded nut 7 in which is mounted a stud 8 which terminates as a valve head 9 adapted to cover port 10, which, when open, connects the space between the casing and the tubing with the interior of the latter through tube 11.

Chamber 5 is connected to the interior of tubing 1 by a short pipe 12 which enters tubing 1 at a point designated as A. Chamber 4 is connected to the interior of tubing 1 through a riser 13 which enters tubing 1 at a point designated as B which may be any selected distance from A and will usually be at least ten feet above A. The upper end of riser 13 actually terminates in the upper end of chamber 14 which is mounted on the side of the tube. A short length of tubing 15 connects the lower end of chamber 14 to the interior of tubing 1. A plug 16 is provided in the upper end of chamber 14 so that the chamber and the riser and chamber 4 may be filled with the standard liquid. The arrangement of riser 13 and tubing 15 in chamber 14, serves to prevent the standard liquid from becoming contaminated by the liquid inside tubing 1. Riser 13 is provided with a choke 17, to prevent chattering of valve head 9.

The pipe 11 connects with the interior of tubing 1 at a point C above point B. The reason for this arrangement is that since the gas lift valve is operated by a difference in specific gravity of the liquid in tubing 1 between point B and the bottom of the diaphragm 6 and the standard liquid in the riser tube between the same points, its operation would become undesirably intermittent if the gas admitted by it were to enter the column of liquid in the tube between points A and B. In other words, by the arrangement shown the shutting off of the device by its own operation is avoided. Pipe 11 is provided with a standard check valve 18, which may be omitted if desired.

The operation of the above described arrangement is relatively simple. The chamber 4 and the riser 13 and chamber 14 are filled with a standard liquid which has a specific gravity intermediate that of the oil being produced when it is free of gas and when it contains enough gas to flow readily under formation pressure, and preferably as close as possible to the latter; that is, the standard liquid in the riser should have a specific gravity approximating the specific gravity of the liquid when it is actually flowing. In other words, this standard liquid will have a lesser specific gravity than would the oil produced after it has been freed from gas.

Let it be assumed that oil containing gas is flowing into the tubing 1. In this case, the column of liquid in the tubing 1 between A and B will be lighter per unit volume than the column of standard liquid in the riser between the same points, whereby the pressure in chamber 4 will be greater than that in chamber 5 and valve head 9 will be seated on inlet port 10. Any additional head or column of liquid which may accumulate in the tubing above the point B will cancel out of the operation of the device because any pressure thereof is applied to both sides of the diaphragm 6 and may be disregarded. If for some reason the oil flow in tubing 1 should stop, the specific gravity of the liquid between points A and B will gradually increase due to gas loss until this column becomes heavier per unit volume than the column of standard liquid in the riser, whereupon the pressure in chamber 5 will tend to exceed that in chamber 4 and push valve head 9 off inlet port 10, allowing high pressure gas from the casing to pass through pipe 11 into the tubing 1 at point C, thereby lifting the liquid above this point up through the tubing. Valve 9 will remain open until by reason of the operation of a lower situated valve, the weight of the liquid in tubing 1 between points A and B again becomes less, or not more, per unit volume than the weight of the standard liquid in the riser.

The operation of a set of the above described valves, installed at given intervals in the tubing string of a gas lift well in which liquid from the formation rises in both the tubing and the casing, is described as follows. With the well tubing connected into the oil storage tanks and the input fluid being admitted into the casing, the liquid level in the casing will be pushed down until the top valve in the tubing string is uncovered. If the liquid inside the tubing opposite this valve has an equal or greater specific gravity than the standard liquid in the valve riser tube, the valve will be in the open position and admit fluid from the casing into the tubing, unloading any liquid in the tubing above this valve. Liquid will continue to pass through this valve from the casing into the tubing until the liquid level in the casing has been pushed far enough down to uncover the next lower valve.

If the gas from the formation has escaped from liquid at the elevation of the second valve such liquid will be dead and its specific gravity sufficient to have caused that valve to be in open position and admit fluid from the casing into the inside of the tubing to aerate the dead liquid so that it will rise inside the tubing and lighten the liquid opposite the valve above sufficiently to close it. Fluid will continue to enter the tubing from the casing through the second valve until the liquid level in the casing has been pushed down far enough to uncover the next lower or third valve and admit gaseous fluid at this point.

In like manner, the valves in the tubing string below this point will be uncovered successively as the liquid level in the casing is lowered by the gaseous fluid injected into the casing, closing the next higher valve as the valve underneath admits gaseous fluid into the tubing string, until a point will be reached where the available input fluid pressure on the casing will push the liquid level in the casing down no farther, at which point gaseous fluid will continue to pass from the casing into the tubing through the lowest valve above the liquid level in the casing that has a greater pressure outside the tubing than inside, all valves above this valve remaining closed.

Should the casing pressure at the surface decrease sufficiently to permit the liquid level in the casing to rise above the valve where gaseous fluid is being admitted into the tubing, then the admission of gaseous fluid into the tubing will be cut off and flow up the tubing string might then stop for want of gas to sufficiently aerate liquid in the tubing and permit dead liquid to settle back down the inside of the tubing. When this dead liquid inside the tubing rises to the first valve above the liquid level in the casing, the specific gravity of the liquid in the tubing will then be great enough to open this valve and admit gas from the casing into the tubing and resume flow out of the well. The valves will react in a similar manner to slugs of liquid being pushed up the tubing, and will open and admit gaseous fluid into the tubing as long as a slug of dead liquid of the length equal to the spacing between the two diaphragm tubes inside the tubing is opposite any valve.

Figure 3:
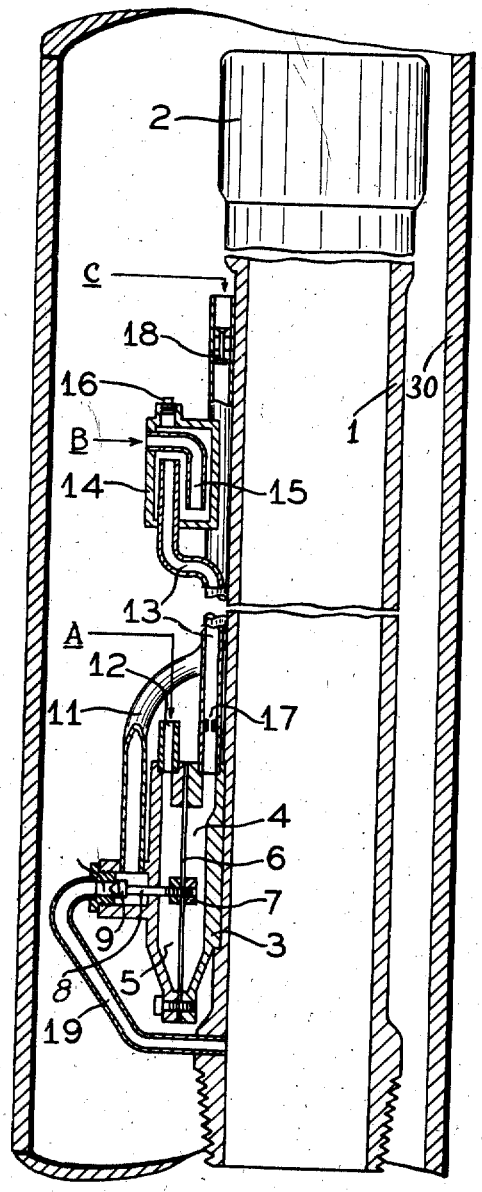
Figure 3 is a side elevation, partly in section, of a modification of the arrangement shown in Figure 1.

The arrangement shown in Figure 3 differs from that shown in Figure 1 in that it is adapted for an operation in which oil is produced by being caused to flow upwardly between the tubing and the casing and high pressure gas is fed in through the tubing. For this reason, pipes 12 and 15 open to the exterior of tubing 1 instead of to its interior. This is also true of tube 11. Inlet port 10, on the other hand, is connected to the interior of tubing 1 by an additional tube 19.

Figure 4:
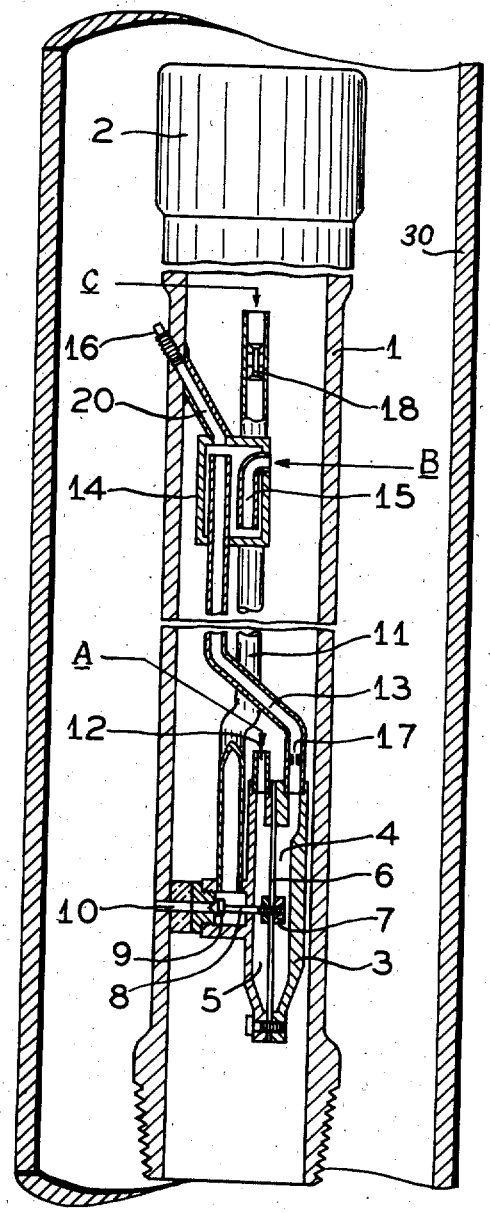
Figure 4 is a side elevation, partly in section, of another modification of the arrangement shown in Figure 1.

The arrangement shown in Figure 4 differs from that shown in Figure 1 only in that the valve assembly is affixed to the interior of the tubing 1 instead of to its exterior. To this end the plug which carries the inlet port 10 is extended through the wall of tubing 1 so as to communicate with the space between the tubing and the casing. Likewise, since plug 16 must be accessible outside the tubing, a pipe 20 is connected to the opening at the top of chamber 14 and to the wall of tubing 1 and plug 16 is inserted into the end of this pipe.

Figure 5:
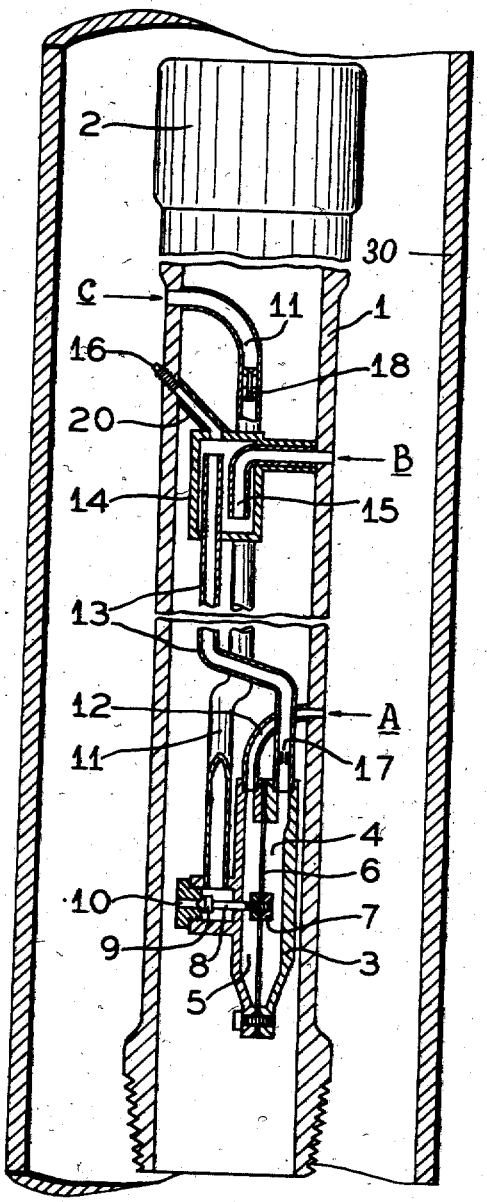
Figure 5 is a side elevation, partly in section, of still another modification of the arrangement shown in Figure 1.

The arrangement shown in Figure 5 is used for wells in which the flow of oil is upwardly between the tubing and the casing. In order to provide for this, tube 11 is extended to the wall of the tube 1 and communicates with the exterior thereof. Likewise, pipes 12 and 15, instead of terminating inside of tubing 1, are extended to the wall of tubing 1 and communicate with the exterior thereof. Otherwise the arrangement is precisely the same as that illustrated in Figure 4, except that the port 10 communicates with the inside of the tubing 1 instead of the outside.

The above discussion has been based on an assembly in which the valve 9 is on its seat when the diaphragm is in neutral position and the standard liquid in the riser has a specific gravity less than that of the oil produced from the well when it is free of gas. It is apparent that the combination of parts will function similarly when valve 9 is of such length as to be off its seat when the diaphragm is in neutral position and a standard liquid having the same gravity as the oil produced when it is free of gas is employed in the riser. In many cases this arrangement will be more convenient since it permits the use of dead oil produced from the deposit in the riser. With this oil in the riser the length of the valve and the strength of the diaphragm can be so adjusted that the valve will remain open until the liquid in the conduit being produced from the deposit has a gravity which may, for example, be at least 25% less than the specific gravity of the dead oil. Consequently, when the oil in the conduit contains enough gas to flow, the valve will be closed by reason of the greater specific gravity of the dead oil in the riser. As flow in the conduit diminishes and the specific gravity of the liquid in the conduit increases by reason of loss of gas, and approaches the specific gravity of the dead oil in the riser, the valve will open and start the injection of gas into the conduit.

This latter arrangement has the distinct advantage that it helps make possible the maintenance of the lowest exposed valve on the string of tubing in open position. The specific gravity of the liquid being produced from the deposit increases with depth. Consequently, the deeper in the well the valve is placed, the closer will the liquid in the conduit approach the dead oil in the riser in specific gravity and the greater will the tendency of the valve to remain open become.

Various changes in the above described arrangements may occur to those skilled in the art. For example, the sensitivity of the valve assembly may be increased by increasing the height of the riser and/or increasing the size of the diaphragm. Positive action of the valve may be aided by the arrangement of suitably selected springs on either or both sides of the diaphragm or around the valve stem. The particular type of valve illustrated, which was designedly chosen simply for ease of description, may be replaced by any one of the number of known valves of different design.

All such changes in arrangement of parts and size and design of individual elements which do not involve a departure from the basic principles underlying the present invention are contemplated within the scope of the appended claims in which it is intended to claim the invention as broadly as the prior art permits.

What is claimed is:

1. An assembly for the production of liquid from a subsurface deposit comprising a conduit establishing liquid connection between said deposit and the surface, a source of high pressure gas, a passage connecting said source to the interior of said conduit, a valve for controlling said passage, and means sensitive to the specific gravity of the liquid in said conduit solely at a point below the point of connection thereto of said gas passage for fixing the position of said valve.

2. An assembly for the production of oil from a subsurface deposit comprising a conduit establishing liquid connection between said deposit and the surface, a diaphragm arranged adjacent the wall of said conduit, a source of high pressure gas, a passage connecting said source to the interior of said conduit, a valve for controlling said passage actuated by said diaphragm, a chamber on each side of said diaphragm, means connecting one of said chambers to the interior of said conduit, means for maintaining a constant head of standard liquid of selected specific gravity connected to the other chamber and means connecting the top of said head of standard liquid to the interior of said conduit.

3. In an assembly for producing oil from a sub-surface formation, in combination, a conduit for leading the oil from the formation to the surface, a source of high pressure gas normally maintained out of fluid connection with said conduit by a valve, means adjacent the wall of said conduit for holding a column of liquid of selected specific gravity, means for opposing said column to a column of liquid of the same height in the conduit, and means actuated by a difference in specific gravity between the liquids of said columns for controlling the position of the aforesaid valve.

4. In an assembly for producing oil from a subsurface formation, in combination, a conduit for leading the oil from the formation to the surface, a source of high pressure gas normally maintained out of fluid connection with said conduit by a valve, means adjacent the wall of said conduit for holding a column of liquid of selected specific gravity, means for opposing said column to a column of liquid of the same height in the conduit, and means actuated by a difference in specific gravity between the liquids of said columns in favor of the liquid of selected specific gravity for opening the aforesaid valve.

5. A flow valve of the character described having its component parts mounted adjacent the wall of a conduit connecting a subsurface formation with the surface comprising a pair of chambers separated by a partition, a diaphragm in one chamber dividing it into two sections, a fluid inlet passage and a fluid outlet passage arranged in the other chamber, a tube connecting said fluid outlet passage to the interior of said conduit and a valve for controlling said inlet passage having its stem passing through said partition and attached to said diaphragm and means for actuating said diaphragm.

6. In an assembly for producing oil from a sub-surface formation, in combination, a conduit for leading the oil from the formation to the surface, a source of high pressure gas, a pair of juxtaposed chambers separated by a partition arranged adjacent a wall of said conduit, a diaphragm in one of said chambers dividing it into two sections, a tube connecting one of said sections to the interior of the conduit at a given point, a riser adapted to hold a liquid of selected specific gravity extending upwardly from the other section, said riser being fluidly connected to the interior of said conduit at a point above the aforesaid given point, a fluid connection between the second chamber and the interior of said conduit at a point above the point of connection of the riser thereto, a fluid connection between said second chamber and the source of high pressure gas, and a valve actuated by said diaphragm for controlling the last mentioned fluid connection.

7. A combination, according to the preceding claim, in which the riser terminates in the upper end of a chamber the lower end of which is in fluid connection with the interior of the conduit.

8. In an assembly for producing oil from a subsurface formation, in combination, a conduit for leading the oil from the formation to the surface, a source of high pressure gas, a passage connecting said source to the interior of said conduit at a selected point, a valve for controlling said passage, means adjacent the wall of said conduit for holding a column of liquid of selected specific gravity, means for opposing said column to a column of liquid of selected height in said conduit, said latter column being below the point of connection of said high pressure gas passage to said conduit, and means actuated by changes in specific gravity in said column of conduit liquid for controlling the position of the aforesaid valve.

9. An assembly for producing oil from a subsurface formation comprising a conduit for carrying oil from the formation to the surface, means for introducing gas under pressure at a point in said conduit, and means for regulating the flow of gas into the conduit solely in response to variations in the specific gravity of the oil in a relatively short section in said conduit.

10. A gas lift apparatus for oil wells comprising a conduit for carrying oil from the producing formation to the surface, means for introducing gas under pressure at a selected point in said conduit, and means responsive to variations in the specific gravity of oil in said conduit solely at a point below said point of introduction of gas for regulating the flow of gas into the conduit.

11. Apparatus for maintaining a constant gas oil ratio in a liquid eduction pipe in a gas lift well including means for opposing a head of liquid of selected specific gravity against a corresponding head of oil in said pipe, means for supplying gas into the induction pipe, and means for varying the supply of gas into said pipe in proportion to variations in specific gravity in said selected head of oil in said pipe.

12. A gas lift device for producing liquid from an earth bore comprising, a tubular member through which the production liquid flows, said member having a passage for admitting gas under pressure into the member through the wall thereof, and means for opening and closing said passage solely in response to variations in the specific gravity of the liquid extending along a relatively short section of the member.

13. A gas lift device for producing liquid from an earth bore comprising, a tubular member adapted to be lowered into the earth bore and conduct well liquid upwardly therein, said member having a passage in the wall for the admission of gas under pressure through the passage and into the member, and means for opening and closing said passage, said means being responsive to a predetermined specific gravity of the liquid along a relatively short section of the member to open said passage and thereafter responsive to a predetermined lesser specific gravity of the liquid along the relatively short section to close the passage.

14. A gas lift device for producing liquid comprising a tubular member having a passage in the wall thereof for the admission of a gas under pressure from the exterior to the interior thereof, and means for opening and closing said passage, said means being responsive to predetermined different higher and lower specific gravities of the liquid solely along a relatively short section of the member to respectively open and close the passage.

15. A gas lift apparatus for oil wells comprising a tubular member, a conduit to which said tubular member is adapted for connection for carrying liquid from the producing formation to the surface, means for introducing gas under pressure at a selective point in said member, and means responsive to variations in the specific gravity of liquid in said member solely at a point below said point of introduction of gas for admitting the flow of gas into the member.

MAURICE B. THOMAS.